United States Patent
Pitzer et al.

[11] Patent Number: 5,939,637
[45] Date of Patent: Aug. 17, 1999

[54] THREE-PIECE PRESSURE SENSOR WITH HIGH PRESSURE STAINLESS STEEL SENSOR ELEMENT

[75] Inventors: Paul Joseph Pitzer, Kokomo; John Patrick Amos, Cutler, both of Ind.

[73] Assignee: Delco Electronics Corp., Kokomo, Ind.

[21] Appl. No.: 09/032,455

[22] Filed: Feb. 26, 1998

Related U.S. Application Data

[63] Continuation-in-part of application No. 08/986,012, Dec. 5, 1997.

[51] Int. Cl.$^6$ ........................................................ G01L 7/08
[52] U.S. Cl. ................................................................ 73/715
[58] Field of Search ............................. 73/700, 715, 717, 73/719, 720, 723, 725, 726, 756; 338/4

[56] References Cited

U.S. PATENT DOCUMENTS

| | | | |
|---|---|---|---|
| 3,899,766 | 8/1975 | Mermelstein | 338/42 |
| 5,535,629 | 7/1996 | Gerdes et al. | 73/756 |
| 5,587,601 | 12/1996 | Kurtz | 257/417 |
| 5,661,278 | 8/1997 | Atkinson et al. | 200/83 J |

*Primary Examiner*—Max Noori
*Assistant Examiner*—Abdullahi Aw-Musse
*Attorney, Agent, or Firm*—Jimmy L. Funke

[57] ABSTRACT

An improved pressure sensor assembly includes a low-cost pressure port comprising a casing formed of cold rolled steel, a small stainless steel insert and an O-ring. The casing has a threaded slug at one end for attaching the sensor assembly to the wall of a pressure vessel and an annular cup at the other end. The annular cup has a hex-shaped periphery to facilitate installation and removal of the sensor assembly, and defines a cylindrical interior cavity including an annular recess in which the O-ring is disposed. The stainless steel insert has a base portion disposed within the cylindrical cavity atop the annular recess so as to compress the O-ring between the insert and casing, and a neck portion that extends out of the cavity to form a pedestal to which the stainless steel pressure sensor element is welded. The insert is retained relative to the casing by a staking operation in which a portion of the casing is deformed against the neck of the insert. The casing and insert have central axial openings which align when so assembled, placing the sensor element in communication with the interior of the pressure vessel. A connector assembly covering the sensor element environmentally seals the sensor element and provides access to its electrical pressure signal output. Compared to previously known sensor assemblies, the stainless steel content and required machining are significantly reduced, contributing to an overall cost reduction of the sensor assembly.

4 Claims, 2 Drawing Sheets

5,939,637

THREE-PIECE PRESSURE SENSOR WITH HIGH PRESSURE STAINLESS STEEL SENSOR ELEMENT

RELATED APPLICATION

This application is a continuation-in-part of U.S. Ser. No. 08/986,012, filed on Dec. 5, 1997, and assigned to the assignee of this application.

FIELD OF THE INVENTION

This invention relates to a high pressure sensor for an automotive system, and more particularly to a low cost three-piece assembly having a stainless steel pressure sensor element.

BACKGROUND OF THE INVENTION

It is necessary for automotive controls to obtain a measure of certain pressure parameters such as engine oil pressure, transmission fluid pressure or brake pressure. To this end it is customary to attach pressure sensors to a pressure vessel. High pressure applications generally utilize a stainless steel pressure sensor element welded to a pressure port which attaches to the vehicle by a threaded fitting, for example. To permit welding, the pressure port is also formed of stainless steel material. Such pressure ports are expensive due to the high cost of stainless steel relative to other materials and the difficulty of machining stainless steel.

Any pressure port design must accommodate a hermetic seal for the sensor (and therefore must be weldable to stainless steel) and must withstand the mechanical stresses such as pressure and torque to which the sensor will be subjected during installation and subsequent use. Proposed alternatives to the one-piece stainless steel pressure port have included multiple piece stainless steel pressure ports. Although this reduces the cost of the pressure port, the cost of the complete sensor is increased due to additional pieces to assemble and the reliability is decreased.

SUMMARY OF THE INVENTION

The present invention provides an improved pressure sensor assembly including a low-cost pressure port comprising a casing formed of cold rolled steel, a small stainless steel insert and an O-ring. The casing has a threaded slug at one end for attaching the sensor assembly to the wall of a pressure vessel and an annular cup at the other end. The annular cup has a hex-shaped periphery to facilitate installation and removal of the sensor assembly, and defines a cylindrical interior cavity including an annular recess in which the O-ring is disposed. The stainless steel insert has a base portion disposed within the cylindrical cavity atop the annular recess so as to compress the O-ring between the insert and casing, and a neck portion that extends out of the cavity to form a pedestal to which the stainless steel pressure sensor element is welded. The insert is retained relative to the casing by a staking operation in which a portion of the casing is deformed against the neck of the insert. The casing and insert have central axial openings which align when so assembled, placing the sensor element in communication with the interior of a pressure vessel to which the assembly is attached. A connector assembly covering the sensor element environmentally seals the sensor element and provides access to its electrical pressure signal output. Compared to previously known sensor assemblies, the stainless steel content and required machining are significantly reduced, contributing to an overall cost reduction of the sensor assembly.

BRIEF DESCRIPTION OF THE DRAWINGS

The above and other advantages of the invention will become more apparent from the following description taken in conjunction with the accompanying drawings wherein like references refer to like parts and wherein:

FIG. 1A is an isometric view; FIG. 1B is an elevational view; and FIG. 1C is a crossection along the lines C—C of FIG. 1B.

DESCRIPTION OF THE INVENTION

FIGS. 1–4 variously depict a pressure sensor assembly 10, or pressure port 10' according to this invention. As indicated, a pressure sensor element 18 is mounted on the pressure port 10' to form a pressure sensor assembly 10.

Figure 1A:
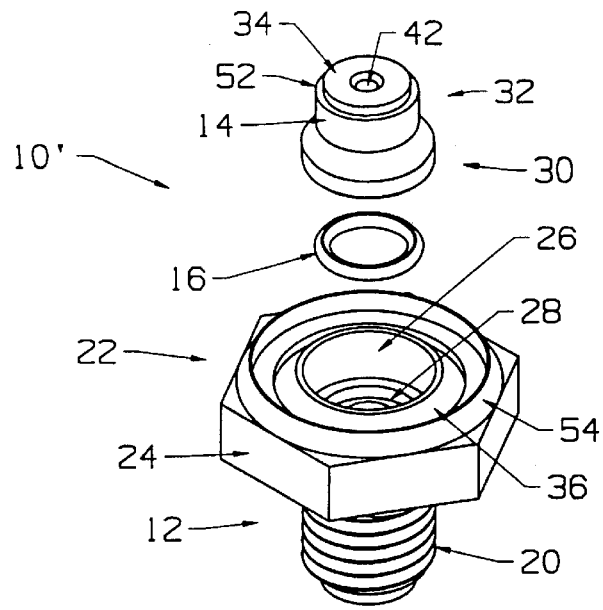
FIGS 1A–1C are exploded views of a pressure port according to the invention prior to assembly.
Figure 1B:
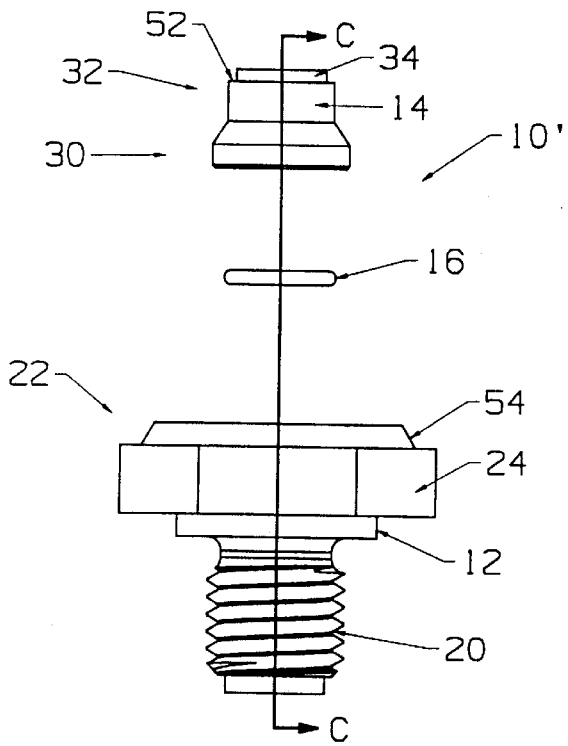
Figure 1C:
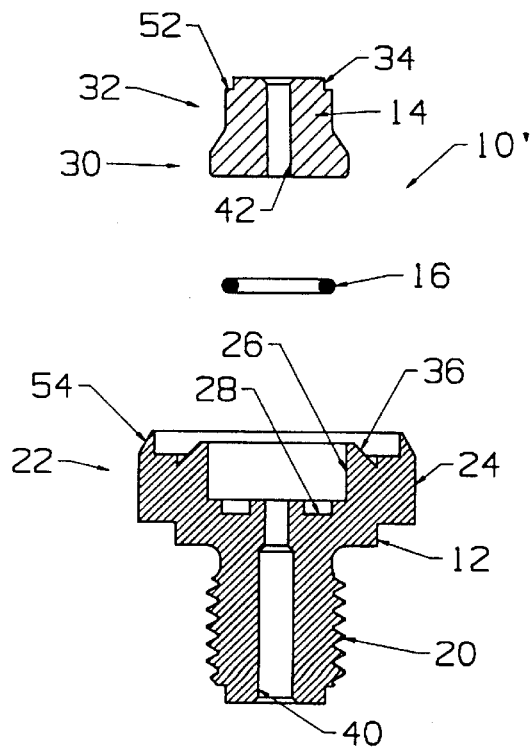
Figure 2:
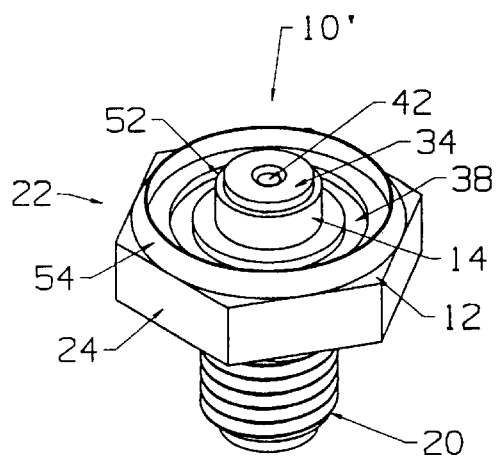
FIG. 2 is an isometric view of a fully assembled pressure port according to this invention.
Figure 4:
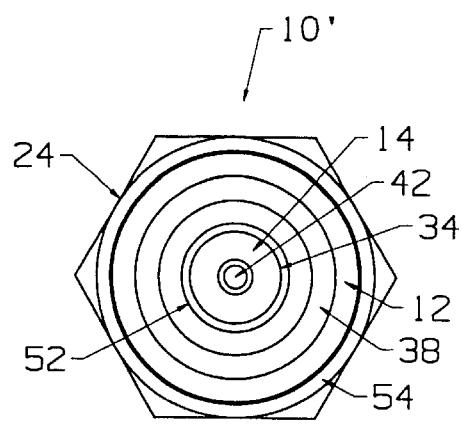
FIG. 4 is a top view of the pressure port of FIG. 2.
Figure 3A:
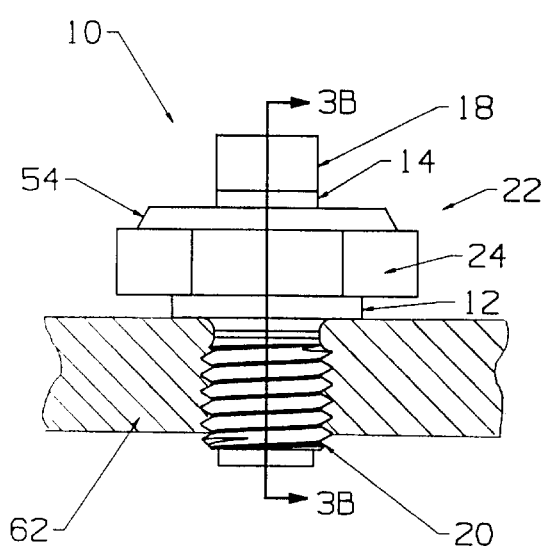
FIG. 3A is an elevational view of a fully assembled pressure sensor according to this invention.
Figure 3B:
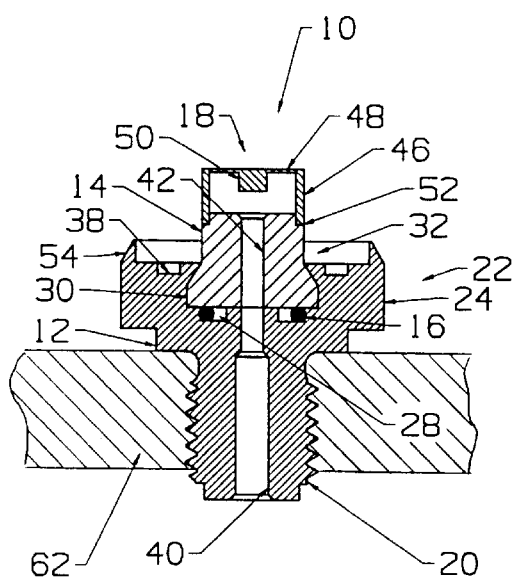
FIG. 3B shows a crossection taken along lines 3B–3B in FIG. 3A.

The pressure sensor assembly 10 is designed to be threaded into a pressure vessel wall 62, such as the housing of a brake master cylinder, engine crankcase, etc., as shown in FIGS. 3A–3B. The assembly 10 comprises a casing 12, an insert 14, an O-ring 16 and a pressure sensor 18. The casing 12 is formed of inexpensive cold rolled steel, whereas insert 14 is formed of stainless steel (preferably 304 or 316 stainless steel for weldability) so that the sensor 18 can be welded to it. The casing 12 has a threaded slug portion 20 at one end for attachment to the pressure vessel wall 62, and an annular cup portion 22 at the other end. The annular cup portion 22 has a hex-shaped periphery 24 adapted to be engaged by a tool (not shown) when the assembly 10 is installed in or removed from the pressure vessel wall 62. Additionally, the cup portion 22 defines a cylindrical interior cavity 26, and a central annular recess 28 formed in the bottom of the cavity 26 for retaining the O-ring 16. The insert 14 has a base portion 30 and a neck portion 32. The base portion 30 is disposed within the cavity 26 atop the annular recess 28 so as to compress the O-ring 16 between the insert 14 and casing 12, and the neck portion 32 extends out of the cavity 26 to form a pedestal 34 to which the sensor element 18 is welded. The insert 14 is retained relative to casing 12 by a staking operation in which a raised boss 36 of casing 12, best seen in the exploded view of FIG. 1, is staked or otherwise deformed against the neck portion 32 of insert 14. Subsequent to the staking operation, the boss 36 is flattened as best shown in FIG. 3B, leaving a generally circular recess 38. The casing 12 and insert 14 have central axial openings 40 and 42 which align when assembled as shown, placing the underside of sensor element 18 in communication with the interior of the pressure vessel.

The stainless steel pressure sensor element 18 comprises a cylindrical wall 46 and a thin diaphragm 48 with a central mass 50. The sensor wall 46 is seated on a narrow step 52 formed on the periphery of pedestal 34 so that the mass 50 is axially aligned with the central openings 40 and 42. The sensor element 18 is welded onto the pedestal 34 by a laser or electron beam welder, providing a hermetic seal. A good weld is possible due to the stainless steel composition of both insert 14 and sensor 18. Stress sensitive elements formed on the exposed surface of diaphragm 48 between the mass 50 and the wall 46, and connected in a bridge arrangement, have a resistance characteristic that changes with the pressure coupled to the underside of sensor 18 through the central openings 40 and 42. These elements are coupled (by wire bonding, for example) to an integrated circuit chip (not shown) which may be mounted on the outer surface of diaphragm 48 opposite mass 50. The integrated circuit detects and amplifies the resistance variations due to the sensed pressure, and provides an electrical signal output indicative of the sensed pressure. A plastic terminal assembly (not shown) with terminal pins coupled to the integrated circuit is seated on the cup portion 22, retained by a peripheral flange 54, and is secured thereon to complete the sensor assembly 10.

As described above, the assembly of the present invention admits of reduced material and fabrication costs compared to one-piece and two-piece stainless steel pressure ports and yet maintains high reliability. While the invention has been described in reference to the illustrated embodiment, it will be understood that various modifications will occur to those skilled in the art, and that sensor assemblies incorporating such modifications may fall within the scope of this invention, which is defined by the appended claims.

The embodiments of the invention in which an exclusive property or privilege is claimed are defined as follows:

1. A pressure sensor assembly for a sensor element having a stainless steel body in direct contact with a fluid in a pressure vessel, the assembly comprising:

a non-stainless steel casing having a central axial bore, a threaded slug portion at a first axial end for attachment of said sensor assembly to the pressure vessel and a cup portion at a second axial end, the cup portion having a flat-sided outer periphery engageable by a tool during attachment and removal of said sensor assembly, the cup portion further including a central interior cavity including a central annular recess formed in a bottom surface of such cavity;

an O-ring disposed in the central annular recess of said casing; and a stainless steel insert having a central axial bore, a base portion disposed and secured within the central cavity of said casing atop said central annular recess so as to compress the O-ring between the insert and casing, and a central neck portion extending axially out of the cavity to form a pedestal;

wherein the stainless steel pressure sensor element is welded to the pedestal of said insert to hermetically seal said sensor element to said insert, the central axial bores of said casing and insert being axially aligned, placing said pressure sensor element in direct communication with the fluid in said pressure vessel.

2. The sensor assembly of claim 1, wherein the base portion of said insert has a lateral dimension which is greater than a lateral dimension of said neck portion, and said insert is secured within said central cavity by a portion of said cup portion adjacent said central cavity deformed against said neck portion.

3. The sensor assembly of claim 1, wherein said casing is formed of cold rolled steel.

4. A pressure sensor assembly for a sensor element having a stainless steel body in direct contact with a fluid in a pressure vessel, the assembly comprising:

a non-stainless steel casing formed of cold rolled steel with a central axial bore, said casing having a threaded slug portion at a first axial end for attachment of said sensor assembly to the pressure vessel and a cup portion at a second axial end, the cup portion having a hexagonal outer periphery engageable by a tool during attachment and removal of said sensor assembly, and a cylindrical interior cavity including a central annular recess formed in a bottom surface of such cavity;

an O-ring disposed in the central annular recess of said casing; and an insert formed of weldable stainless steel with a central axial bore, said insert having a cylindrical base portion disposed within said cylindrical cavity atop said central annular recess so as to compress the O-ring between the insert and casing, and a central neck portion extending axially out of the cavity to form a pedestal, said neck portion having a lateral dimension which is smaller than said base portion, and said insert being secured relative to said casing by a portion of said casing deformed against said neck portion;

wherein the stainless steel pressure sensor element is welded to the pedestal of said insert to hermetically seal said sensor element to said insert, the central axial bores of said casing and insert being axially aligned, placing said pressure sensor element in direct communication with the fluid in said pressure vessel.

* * * * *